(12) United States Patent
Forster et al.

(10) Patent No.: US 7,501,955 B2
(45) Date of Patent: Mar. 10, 2009

(54) RFID DEVICE WITH CONTENT INSENSITIVITY AND POSITION INSENSITIVITY

(75) Inventors: Ian J. Forster, Chelmsford (GB); Adrian N. Farr, Dunmow (GB)

(73) Assignee: Avery Dennison Corporation, Pasadena, CA (US)

( * ) Notice: Subject to any disclaimer, the term of this patent is extended or adjusted under 35 U.S.C. 154(b) by 391 days.

(21) Appl. No.: 11/218,804

(22) Filed: Sep. 2, 2005

(65) Prior Publication Data

US 2006/0055542 A1 Mar. 16, 2006

Related U.S. Application Data

(60) Provisional application No. 60/609,375, filed on Sep. 13, 2004.

(51) Int. Cl.
*G08B 13/14* (2006.01)
*H01Q 7/08* (2006.01)
*H01Q 9/16* (2006.01)

(52) U.S. Cl. ............ 340/572.7; 343/788; 343/793

(58) Field of Classification Search .......... 343/700 MS, 343/788, 793, 741, 787, 866, 895; 235/492; 340/572.7
See application file for complete search history.

(56) References Cited

U.S. PATENT DOCUMENTS

| | | | |
|---|---|---|---|
| 3,631,499 A | 12/1971 | Turner | |
| 4,038,662 A * | 7/1977 | Turner | ............ 343/752 |
| 4,142,674 A | 3/1979 | Walton et al. | |
| 4,706,050 A | 11/1987 | Andrews | |
| 4,786,907 A | 11/1988 | Koelle | |
| 4,816,839 A | 3/1989 | Landt | |
| 4,860,019 A * | 8/1989 | Jiang et al. | ............ 343/795 |
| 5,153,983 A | 10/1992 | Oyama | |
| 5,430,441 A | 7/1995 | Bickley et al. | |
| 5,491,483 A | 2/1996 | D'Hont | |
| 5,545,291 A | 8/1996 | Smith et al. | |
| 5,557,279 A | 9/1996 | D'Hont | |
| 5,563,616 A | 10/1996 | Dempsey et al. | |
| 5,564,888 A | 10/1996 | Doan | |
| 5,621,199 A | 4/1997 | Calari et al. | |
| 5,783,856 A | 7/1998 | Smith et al. | |
| 5,793,305 A | 8/1998 | Turner et al. | |
| 5,824,186 A | 10/1998 | Smith et al. | |
| 5,854,480 A | 12/1998 | Noto | |
| 5,874,724 A | 2/1999 | Cato | |
| 5,904,545 A | 5/1999 | Smith et al. | |

(Continued)

FOREIGN PATENT DOCUMENTS

DE 197 03 864 6/1998

(Continued)

*Primary Examiner*—Shih-Chao Chen (57) ABSTRACT

An RFID device includes an antenna structure that provides good performance throughout a range of different positions relative to nearby materials, such as metallic objects in a carton or other container. The antenna structure has compensation elements that interact with the nearby materials to provide good performance over the range of different positions. The compensation elements include both electrical compensation elements, which interact with the nearby materials primarily using electric fields, and magnetic compensation elements, which interact with the nearby materials primarily using magnetic fields. The electrical compensation elements and the magnetic compensation elements may be selected and may be positioned within the antenna structure such that the performance of the antenna structure is substantially unchanged (or at least acceptable) through the range of different positions.

24 Claims, 7 Drawing Sheets

U.S. PATENT DOCUMENTS

| | | | |
|---|---|---|---|
| 5,965,494 | A | 10/1999 | Terashima et al. |
| 5,973,598 | A | 10/1999 | Beigel |
| 5,977,877 | A | 11/1999 | McCulloch et al. |
| 5,983,363 | A | 11/1999 | Tuttle et al. |
| 6,001,211 | A | 12/1999 | Hiroyuki |
| 6,043,746 | A | 3/2000 | Sorrells |
| 6,078,791 | A | 6/2000 | Tuttle et al. |
| 6,104,291 | A | 8/2000 | Beauvillier et al. |
| 6,107,920 | A | 8/2000 | Eberhardt et al. |
| 6,133,836 | A | 10/2000 | Smith |
| 6,140,967 | A | 10/2000 | Kolsrud |
| 6,145,901 | A | 11/2000 | Rich |
| 6,147,604 | A | 11/2000 | Wiklof et al. |
| 6,147,605 | A | 11/2000 | Vega et al. |
| 6,147,606 | A | 11/2000 | Duan |
| 6,166,613 | A | 12/2000 | Nakagawa et al. |
| 6,172,609 | B1 | 1/2001 | Lu et al. |
| 6,204,764 | B1 | 3/2001 | Maloney |
| 6,206,292 | B1 | 3/2001 | Robertz et al. |
| 6,215,402 | B1 | 4/2001 | Rao Kodukula et al. |
| 6,236,314 | B1 | 5/2001 | Smith et al. |
| 6,236,316 | B1 | 5/2001 | Eberhardt et al. |
| 6,243,013 | B1 | 6/2001 | Duan et al. |
| 6,259,369 | B1 | 7/2001 | Monico |
| 6,259,408 | B1 | 7/2001 | Brady et al. |
| 6,262,682 | B1 | 7/2001 | Shibata |
| 6,262,692 | B1 | 7/2001 | Babb |
| 6,265,977 | B1 | 7/2001 | Vega et al. |
| 6,274,508 | B1 | 8/2001 | Jacobsen et al. |
| 6,278,369 | B2 | 8/2001 | Smith et al. |
| 6,278,413 | B1 | 8/2001 | Hugh et al. |
| 6,281,038 | B1 | 8/2001 | Jacobsen et al. |
| 6,281,794 | B1 | 8/2001 | Duan et al. |
| 6,281,850 | B1 | 8/2001 | Klostermann |
| 6,285,342 | B1 * | 9/2001 | Brady et al. ............... 343/895 |
| 6,291,896 | B1 | 9/2001 | Smith |
| 6,316,278 | B1 | 11/2001 | Jacobsen et al. |
| 6,320,509 | B1 | 11/2001 | Brady et al. |
| 6,320,545 | B1 | 11/2001 | Nagumo et al. |
| 6,329,915 | B1 | 12/2001 | Brady et al. |
| 6,339,385 | B1 | 1/2002 | Tuttle |
| 6,342,866 | B1 | 1/2002 | Ho et al. |
| 6,380,729 | B1 | 4/2002 | Smith |
| 6,384,727 | B1 | 5/2002 | Diprizio et al. |
| 6,392,544 | B1 | 5/2002 | Collins et al. |
| 6,407,665 | B2 | 6/2002 | Maloney |
| 6,417,025 | B1 | 7/2002 | Gengel |
| 6,451,154 | B1 | 9/2002 | Grabau et al. |
| 6,486,783 | B1 | 11/2002 | Hausladen et al. |
| 6,501,435 | B1 | 12/2002 | King et al. |
| 6,504,511 | B2 | 1/2003 | Andersson |
| 6,535,175 | B2 | 3/2003 | Brady et al. |
| 6,563,463 | B1 | 5/2003 | Saito |
| 6,577,208 | B2 | 6/2003 | Kushitani et al. |
| 6,600,420 | B2 | 7/2003 | Goff et al. |
| 6,665,193 | B1 | 12/2003 | Chung et al. |
| 6,667,092 | B1 | 12/2003 | Brollier et al. |
| 6,683,254 | B1 | 1/2004 | Gunnels |
| 6,690,264 | B2 | 2/2004 | Dalglish |
| 6,703,985 | B2 | 3/2004 | Lee |
| 6,720,866 | B1 | 4/2004 | Sorrells et al. |
| 6,774,782 | B2 | 8/2004 | Runyon et al. |
| 6,825,754 | B1 | 11/2004 | Rolin |
| 6,838,377 | B2 | 1/2005 | Tonami et al. |
| 6,856,285 | B2 | 2/2005 | Bettin et al. |
| 6,914,562 | B2 | 7/2005 | Forster |
| 6,951,596 | B2 | 10/2005 | Green et al. |
| 7,088,304 | B2 * | 8/2006 | Endo et al. .................. 343/788 |
| 7,091,859 | B2 * | 8/2006 | Duron et al. ............. 340/572.1 |
| 2001/0006368 | A1 | 7/2001 | Maloney |
| 2001/0043162 | A1 | 11/2001 | Babb |
| 2001/0053675 | A1 | 12/2001 | Plettner |
| 2001/0054755 | A1 | 12/2001 | Kirkham |
| 2002/0035701 | A1 | 3/2002 | Casebolt et al. |
| 2002/0125566 | A1 | 9/2002 | Tonami et al. |
| 2002/0126057 | A1 | 9/2002 | King et al. |
| 2002/0145520 | A1 | 10/2002 | Maloney et al. |
| 2002/0175873 | A1 | 11/2002 | King et al. |
| 2003/0210188 | A1 | 11/2003 | Hebron et al. |
| 2004/0001029 | A1 | 1/2004 | Parsche et al. |
| 2004/0032330 | A1 | 2/2004 | Hoffman |
| 2004/0032377 | A1 | 2/2004 | Forster et al. |
| 2004/0046020 | A1 | 3/2004 | Andreasson et al. |
| 2004/0046643 | A1 | 3/2004 | Becker et al. |
| 2004/0059629 | A1 | 3/2004 | Luo et al. |
| 2004/0066280 | A1 | 4/2004 | Pratt et al. |
| 2004/0075607 | A1 | 4/2004 | Cathey |
| 2004/0178912 | A1 | 9/2004 | Smith et al. |

FOREIGN PATENT DOCUMENTS

| | | |
|---|---|---|
| DE | 101 36 502 | 2/2003 |
| EP | 0 254 954 | 7/1987 |
| EP | 0 896 706 | 4/1997 |
| GB | 2293050 | 9/1995 |
| WO | WO 82/00541 | 2/1982 |
| WO | WO 93/05489 | 3/1993 |
| WO | WO 98/40930 | 9/1998 |
| WO | WO 00/16277 | 3/2000 |
| WO | WO 00/16280 | 3/2000 |
| WO | WO 00/41148 | 7/2000 |
| WO | WO 00/43952 | 7/2000 |
| WO | WO 01/50547 | 7/2001 |
| WO | WO 01/61646 | 8/2001 |
| WO | WO 01/71686 | 9/2001 |
| WO | WO 01/73864 | 10/2001 |
| WO | WO 01/79988 | 10/2001 |
| WO | WO 01/80174 | 10/2001 |
| WO | WO 02/29929 | 4/2002 |
| WO | WO 02/097723 | 12/2002 |
| WO | WO 03/009007 | 1/2003 |
| WO | WO 2004/025554 | 3/2004 |
| WO | WO 2004/036689 | 4/2004 |
| WO | WO 2004/046762 | 6/2004 |
| WO | WO 2004/093243 | 10/2004 |
| WO | WO 2004/093246 | 10/2004 |
| WO | WO 2004/093249 | 10/2004 |
| WO | WO 2005/073937 | 1/2005 |

* cited by examiner

RFID DEVICE WITH CONTENT INSENSITIVITY AND POSITION INSENSITIVITY

This application claims priority from U.S. Provisional Application No. 60/609,375, filed Sep. 13, 2004.

BACKGROUND OF THE INVENTION

1. Field of the Invention

This invention relates to the field of radio frequency identification (RFID) tags and labels.

2. Description of the Related Art

RFID tags and labels have a combination of antennas and analog and/or digital electronics, which may include for example communications electronics, data memory, and control logic. RFID tags and labels are widely used to associate an object with an identification code. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which this application incorporates by reference.

RFID tags and labels include active tags, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

RFID tags and labels may communicate with a reader or other device through use of an antenna, which may be used to both transmit and/or receive information and/or energy. There is no simple definition of what constitutes an antenna, as all dielectric and conductive objects interact with electromagnetic fields (radio waves). What are generally called antennas are simply shapes and sizes that generate a voltage at convenient impedance for connection to circuits and devices. Almost anything can act to some degree as an antenna. However, there are some practical constraints on what designs can be used with RFID tags and labels.

First, reciprocity is a major consideration in making a design choice. This means that an antenna which will act as a transmitter, converting a voltage on its terminal(s) into a radiated electromagnetic wave, will also act as a receiver, where an incoming electromagnetic wave will cause/induce a voltage across the terminals. Frequently it is easier to describe the transmitting case, but, in general, a good transmit antenna will also work well as a receive antenna (like all rules, there are exceptions at lower frequencies, but for UHF, in the 900 MHz band and above where RFID tags and labels commonly operate, this holds generally true).

Nevertheless, even given the above, it is difficult to determine what is a "good" antenna, other than to require that it is one that does what you want, where you want and is built how you want it to be.

However, there are some features that are useful as guides in determining whether or not an antenna is "good" for a particular purpose. When one makes a connection to an antenna, one can measure the impedance of the antenna at a given frequency. Impedance is generally expressed as a composite of two parts; a resistance, R, expressed in ohms, and a reactance, X, also expressed in ohms, but with a 'j' factor in front to express the fact that reactance is a vector quantity. The value of jX can be either capacitive, where it is a negative number, or inductive, where it is a positive number.

Having established what occurs when one measures the impedance of an antenna, one can consider the effect of the two parts on the antenna's suitability or performance in a particular situation.

Resistance R is actually a composite of two things; the loss resistance of the antenna, representing the tendency of any signal applied to it to be converted to heat, and the radiation resistance, representing energy being 'lost' out of the antenna by being radiated away, which is what is desired in an antenna. The ratio of the loss resistance and the radiation resistance is described as the antenna efficiency. A low efficiency antenna, with a large loss resistance and relatively small radiation resistance, will not work well in most situations, as the majority of any power put into it will simply appear as heat and not as useful electromagnetic waves.

The effects of Reactance X are slightly more complex than that for Resistance R. Reactance X, the inductive or capacitive reactance of an antenna, does not dissipate energy. In fact, it can be lessened, by introducing a resonant circuit into the system. Simply, for a given value of +jX (an inductor), there is a value of −jX (a capacitor) that will resonate/cancel it, leaving just the resistance R.

Another consideration is bandwidth, frequently described using the term Q (originally Quality Factor). To understand the effect of bandwidth, it is not necessary to understand the mathematics; simply, if an antenna has a value of +jX or −jX representing a large inductance or capacitance, when one resonates this out it will only become a pure resistance over a very narrow frequency band. For example, for a system operating over the band 902 MHz to 928 MHz, if a highly reactive antenna were employed, it might only produce the wanted R over a few megahertz. In addition, high Q/narrow band matching solutions are unstable, in that very small variations in component values or designs will cause large changes in performance. So high Q narrowband solutions are something, in practical RFID tag designs, to be avoided.

An RFID tag, in general, consists of 1) an RFID chip, containing rectifiers to generate a DC power supply from the incoming RF signal, logic to carry out the identification function and an impedance modulator, which changes the input impedance to cause a modulated signal to be reflected; and, 2) an antenna as described above.

Each of these elements has an associated impedance. If the chip impedance (which tends to be capacitive) and the antenna impedance (which is whatever it is designed to be) are the conjugate of each other, then one can simply connect the chip across the antenna and a useful tag is created. For common RFID chips the capacitance is such that a reasonably low Q adequate bandwidth match can be achieved at UHF or other appropriate frequencies.

However, sometimes it is not so simple to meet operational demands for the tag due to environmental or manufacturing constraints, and then other ways of achieving a good match must be considered. The most common method of maintaining a desired impedance match, is to place between the antenna and chip an impedance matching network. An impedance matching network is usually a network of inductors and capacitors that act to transform both real and reactive parts of the input impedance to a desired level. These components do not normally include resistors, as these dissipate energy, which will generally lead to lower performance.

Difficulties can arise in impedance matching, because the impedance characteristics of an antenna may be affected by its surroundings. This may in turn affect the quality of the impedance matching between the antenna and the RFID chip, and thus the read range for the RFID tag.

The surroundings that may affect the characteristics of the antenna include the substrate material upon which the antenna is mounted, and the characteristics of other objects in the vicinity of the RFID tag. For example, the thickness and/or dielectric constant of the substrate material may affect antenna operation. As another example, placement of conducting or non-conducting objects near the tag may affect the operating characteristics of the antenna, and thus the read range of the tag.

An antenna may be tuned to have desired characteristics for any given configuration of substrate and objects placed around. For example, if each tag could be tuned individually to adjust the arm length and/or add a matching network, consisting of adjustable capacitors and inductors, the tag could be made to work regardless of the dielectric constant of the block. However, individual tuning of antennas would not be practical from a business perspective.

As discussed above, frequently designers optimize tag performance for "free space," a datum generally given a nominal relative dielectric constant of 1. However, in the real world, the objects the labels are attached to frequently do not have a dielectric constant of 1, but instead have dielectric constants or environments of nearby objects that vary widely. For example, a label having a dipole antenna designed and optimized for free space that is instead attached to an object having a dielectric constant that differs from that of free space, will suffer a degraded performance, usually manifesting itself as reduced operational range and other inefficiencies as discussed above.

Therefore, while products having differing fixed dielectric constant substrates can be accommodated by changing the antenna design from the 'free space' design to incorporate the new dielectric constant or to compensate for other objects expected to be nearby the tag, this design change forces the tag manufacturer to produce a broader range of labels or tags, potentially a different type for each target product for which the tag may be applied, hence increasing costs and forcing an inventory stocking problem for the tag manufacturers.

When the tags are to be used on different types of materials that have a range of variable dielectric constants, the best design performance that can be achieved by the tag or label designer is to design or tune the tag for the average value of the range of dielectric constants and expected conditions, and accept degraded performance and possible failures caused by significant detuning in specific cases.

It will be appreciated that improvements would be desirable with regard to the above state of affairs.

SUMMARY OF THE INVENTION

According to an aspect of the invention, an antenna structure includes both electrical compensation elements and magnetic compensation elements.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily according to scale.

DETAILED DESCRIPTION

An RFID device includes an antenna structure that provides good performance throughout a range of different positions relative to nearby materials, such as metallic objects in a carton or other container. The antenna structure has compensation elements that interact with the nearby materials to provide good performance over the range of different positions. The compensation elements include both electrical compensation elements, which interact with the nearby materials primarily using electric fields, and magnetic compensation elements, which interact with the nearby materials primarily using magnetic fields. The electrical compensation elements and the magnetic compensation elements may be selected and may be positioned within the antenna structure such that the performance of the antenna structure is substantially unchanged (or at least acceptable) through the range of different positions. The nearby materials may include dielectric and/or electrically conductive materials that present geometric variations in the environment near the RFID device as the device is moved through the range of different orientations. The geometric variations may include periodic variations, such as in a carton of metal cans lined up one next to another. Alternatively, the geometric variations may have some non-periodic or essentially random aspect, such as for a carton or container of metal objects located at random positions within a dielectric packing material.

The range of different positions may be a one-dimensional range of positions, for example allowing the RFID device to be placed having a given orientation anywhere along a side of a carton or container with a side-by-side row of cans behind the side of the carton or container. The performance of the RFID device may be essentially the same whether a mid-point of the device is placed over one or the cans, or over a space between a pair of adjacent cans. The one-dimensional range of positions may be to center the antenna structure of the RFID device anywhere along a line (or a series of parallel lines), in a given orientation relative to objects or a carton or container.

Alternatively, the range of different positions may be a two-dimensional range of positions, for example allowing the RFID device to be placed substantially anywhere along a side of a carton or container with a side-by-side row of cans behind the side of the carton or container. The range of positions may also be a two-dimensional range of positions when the expected environment is non-periodic or random in placement of electrically-conductive and dielectric objects. The two-dimensional range of positions may involve placing the RFID device substantially anywhere on a carton or container, at any orientation or in any of a range of orientations. The two-dimensional range of positions may involve translations in one or more spatial dimensions, and/or rotation into any of a variety of orientations. A further possibility for the range of positions may include invariance of performance in three spatial dimensions.

The number and placement of compensation elements within the antenna structure may vary, depending upon what environment is expected for the RFID device. It will be appreciated that the arrangement of compensation elements may be more complicated for an RFID device able to achieve acceptable performance over a two-dimensional range of positions, in comparison with a device only able to handle a one-dimensional range of positions.

Before proceeding to a description of the RFID device itself, some relevant definitions are provided of terms and phrases used herein. A "transponder chip" or "chip" is defined as a device for providing suitable interaction, through an antenna, for communication with an external device, such as a reader. A chip may include any of a variety of suitable electrical components, such as resistors, capacitors, inductors, batteries, memory devices, and processors. It will be appreciated that a large variety of transponder chips for RFID devices are widely known. The term "transponder chip" is intended to encompass the broad range of such devices, which may vary widely in complexity and functionality.

The antenna described below includes a plurality of compensation or compensating elements. These are elements that compensate to some extent for changes in operating characteristics of antenna elements of the antenna, due to the interaction of the antenna elements and surrounding materials, such as contents of a carton upon which a label including the antenna is placed. The change in operating characteristics of the antenna elements may manifest itself, for example, in the antenna elements becoming reactive; the radiation resistance of the antenna elements changing, which may cause the antenna efficiency, expressed as the ratio of radiation resistance to the sum of loss resistance and radiation resistance, to drop; and, as a result of the above, the impedance match between the RFID chip and antenna elements may degrade, leading to mismatch loss and hence loss of optimum frequency operating range for the antenna structure. To mitigate these effects on the antenna elements, the compensating elements may: 1) introduce an impedance matching network between the chip and antenna which impedance matches the two, maximizing power transfer between the chip and the antenna elements; and/or 2) change the effective length of the antenna elements so it stays at the resonant condition. These methods may be used separately, or may be used in combination to form a hybrid of the two. Various examples of compensating elements are discussed herein, although it will be appreciated that other types of compensation elements may be utilized.

The compensation elements may include both electrical compensation elements, which interact with the nearby materials primarily using electric fields, and magnetic compensation elements, which interact with the nearby materials primarily using magnetic fields. The electrical compensation elements interact with nearby materials primarily capacatively. The interaction between the compensation elements and the nearby materials is a near-field or short-range coupling, as opposed to a far-field or long-range coupling. Primarily, the antenna as a whole is used for long-range far-field RF coupling to external devices, such as suitable readers. The far field, as used herein, refers to a distance greater than on the order of 15 mm from an RF-energy emitting device, such as a device that emits UHF RF energy. Coupling of an RFID device in the far field is also referred to as "long-range coupling." The near field, where short-range coupling may occur, is defined as within on the order of 15 mm from an RF-energy emitting device. A more precise boundary of between the near field and the far field may be $\lambda/2\pi$, where $\lambda$ is the wavelength of the RF energy of the RF coupling. For RF of energy of 915 MHz, the boundary between the near field and the far field would be about 52 mm from the device, using this definition.

The antenna structure is defined herein as having "substantially invariant" performance throughout a range of position. It will be appreciated that "substantially invariant" performance may be defined with regard to an environment into which the antenna structure is placed, and with regard to a test protocol for quantifying antenna performance. One such environment and protocol for quantifying antenna performance is described below.

Figure 1:
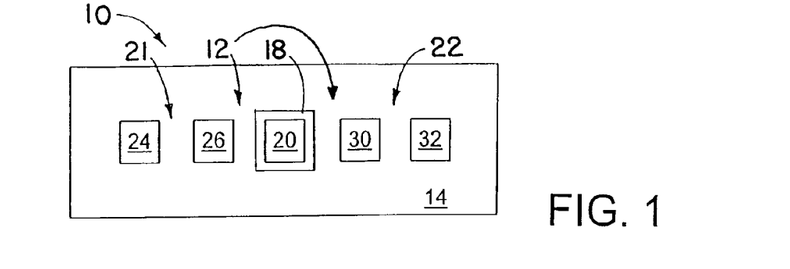
FIG. 1 is a schematic diagram of an RFID device with an antenna structure in accordance with the present invention.

FIG. 1 schematically illustrates an RFID device 10 that has an antenna structure (or antenna) 12 on a substrate 14, and an interposer 18 operatively coupled to the antenna structure 12. The interposer 18 includes a chip 20 that is operatively coupled to the antenna structure 12 to enable communication between the RFID device 10 and an external device, such as a suitable reader or detector. The operative coupling between the chip 20 and the antenna structure 12 may be by any of a variety of suitable mechanisms. The chip 20 may be directly electrically connected to the antenna structure 12, for example utilizing electrically conductive leads on the interposer. Alternatively or in addition, the chip 20 may be indirectly electrically connected to the antenna structure 12, by using of capacitive and/or magnetic coupling.

The antenna structure 12 includes a pair of antenna elements 21 and 22. Each of the antenna elements includes respective plural compensation elements (also referred to herein as "compensating elements" or "adaptive elements"), the antenna element 21 including compensation elements 24 and 26, and the antenna element 22 includes compensation elements 30 and 32. As described above, the compensation elements compensate to some extent for changes in operating characteristics of antenna elements of the antenna, due to the interaction of the antenna elements and surrounding materials, such as contents of a carton upon which a label including the antenna is placed. The pairs of compensation elements 24/26 and 30/32 may each include both electrical compensation elements, which interact with the nearby materials primarily using electric fields, and magnetic compensation elements, which interact with the nearby materials primarily using magnetic fields. The pairs of compensation elements 24/26 and 30/32 may each be configured such that one compensation element of the pair affects performance of the corresponding antenna element in one direction, and the other compensation element of the pair affects performance of the antenna element in an opposite direction. The net effect may be that each compensation element pair 24/26 and 30/32 provides a net effect to make the corresponding antenna element 21 and 22 at least relatively stable in operation as it is moved throughout a range of positions with respect to background objects. For example, one of the compensation elements of each pair 24/26 and 30/32 may be an electrical compensation element, which is sensitive to the dielectric properties of surrounding materials, and the other compensation element of each pair may be a magnetic compensation element, which is sensitive to the conductive properties of surrounding materials. The compensation elements 24/26 and 30/32 may be placed within the antenna elements 21 and 22 at locations such that when an electrical compensation element is encountering a surrounding environment causing it to affect antenna performance in one way (say, by changing gain or operating frequency), the other compensation element is encountering a surrounding environment that causes it to have an opposite effect on system performance. By selectively distributing the compensation elements 24/26 and 30/32 along the antenna elements, substantially invariant performance for the antenna structure 12 may be achieved, at least for a range of positions for a given environment.

The compensation elements 24/26 and 30/32 are shown in FIG. 1 as discrete elements within the antenna elements 21 and 22. However, it will be appreciated that the compensation elements 24/26 and 30/32 may share the same space or overlap in each of the antenna elements 21 and 22. Moreover, it will be appreciated that the antenna elements 21 and 22 may each include any suitable number of compensation elements, positioned at any of a variety of suitable locations within the antenna elements 21 and 22. In addition, individual of the compensation elements may by coupled to both of the antenna elements 21 and 22, and interact with both elements to affect performance of both antenna elements 21 and 22.

Examples of suitable materials for the substrate 14 include, but are not limited to, high Tg polycarbonate, polyethylene terephthalate (PET), polyarylate, polysulfone, a norbornene copolymer, poly phenylsulfone, polyetherimide, polyethylenenaphthalate (PEN), polyethersulfone (PES), polycarbonate (PC), a phenolic resin, polyester, polyimide, polyetherester, polyetheramide, cellulose acetate, aliphatic polyurethanes, polyacrylonitrile, polytrifluoroethylenes, polyvinylidene fluorides, HDPEs, poly(methyl methacrylates), a cyclic or acyclic polyolefin, or paper.

The antenna 12 may include any of a wide variety of conductive materials, placed on the substrate 14 in any of a variety of suitable ways. The antenna 12 may be formed of conductive ink printed on or otherwise deposited on the substrate 14. Alternatively, the antenna 12 may be an etched conductive material that is adhesively or otherwise adhered to the substrate 14. Other possible alternatives for formation of the antenna 12 include deposition methods such as vapor deposition or sputtering, and plating methods such as electroplating.

Examples of suitable interposers include an RFID interposer available from Alien Technologies, and the interposer marketed under the name I-CONNECT, available from Philips Electronics. Use of the interposer 18 may facilitate operative coupling of the chip 20 and the antenna structure 12. It will be appreciated that alternatively the chip 20 may be directly coupled to the antenna structure 12, without use of the interposer 18.

Figure 2:
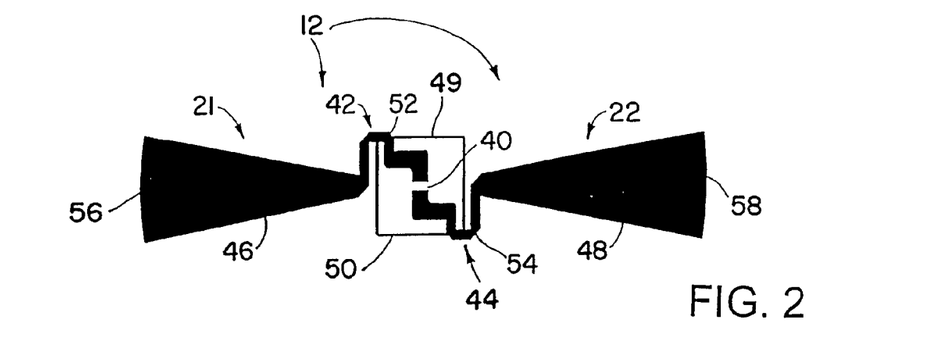
FIG. 2 is a plan view of one embodiment of an antenna structure in accordance with the present invention.

FIG. 2 shows details of one embodiment of the antenna structure 12. The antenna structure 12 includes a gap 40 between the antenna elements 21 and 22, for coupling of an interposer or chip to the antenna elements 21 and 22. The antenna elements 21 and 22 include respective feed lines 42 and 44 that provide an electrically-conductive link between the gap 40 and respective conductive areas 46 and 48 of the antenna elements 21 and 22. The antenna structure 12 also includes conductive inductor lines 49 and 50 that electrically couple the feed lines 42 and 44 together.

The feed lines 42 and 44 include meanders or turns 52 and 54, such that parts of the feed lines 42 and 44 pass close to other parts of the feed lines 42 and 44, and the parts are able to electrically interact with one another. This electrical interaction causes a change in electrical properties of the feed lines 42 and 44, depending upon the amount and type of dielectric material in the vicinity of the feed lines 42 and 44.

The conductive areas 46 and 48 have tapered shapes, being relatively narrow at the proximal ends where they connect to the feed lines 42 and 44, and being relatively wide at their distal ends 56 and 58. The change of width of conductive areas 46 and 48 may increase with constant slope from the proximal ends to the distal ends 56 and 58. The ends 56 and 58 of the conductive areas 46 and 48 may be shaped in order to interact, through electric fields, with nearby dielectric materials. As shown in FIG. 2, the ends 56 and 58 are curved. However, the distal ends may alternatively have a wide variety of other non-straight shapes, for example being notched.

The conductive inductor lines 49 and 50 allow flow of current between the antenna elements 21 and 22. Current flow in the inductor lines 49 and 50 generates a local magnetic field that may interact with nearby electrically conductive objects or materials.

Thus the antenna structure 12 includes at least three types of compensation elements: 1) the feed lines 42 and 44 with their meanders or turns 52 and 54, which are electrical compensation elements; 2) the curved ends 56 and 58 of the tapered conductive areas 46 and 48, which also are electrical compensation elements; and 3) the conductive inductor lines 49 and 50, which function as magnetic compensation elements. The antenna structure 12 may have an overall length (between the distal ends 56 and 58) of 140 mm, and an overall width of about 25 mm, with a width of the conductive inductor lines 49 and 50 of about 5 mm, although it will be appreciated that these dimensions are only for a single specific embodiment, and that the antenna structure 12 may have other suitable dimensions.

Figure 3:
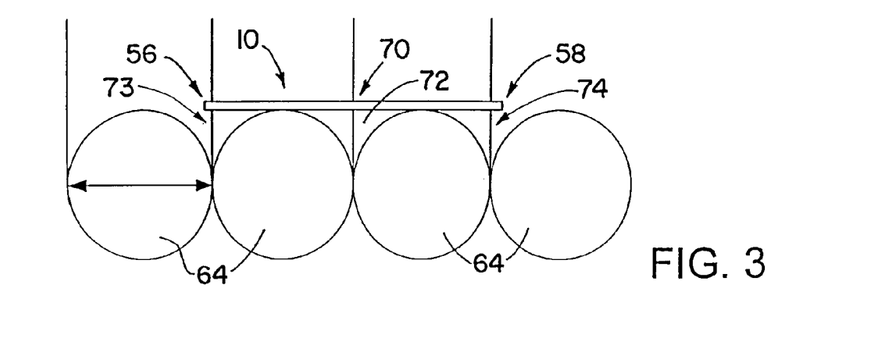
FIG. 3 is a plan view illustrating one possible placement of an RFID device with the antenna structure of FIG. 2, relative to a row of objects.
Figure 4:
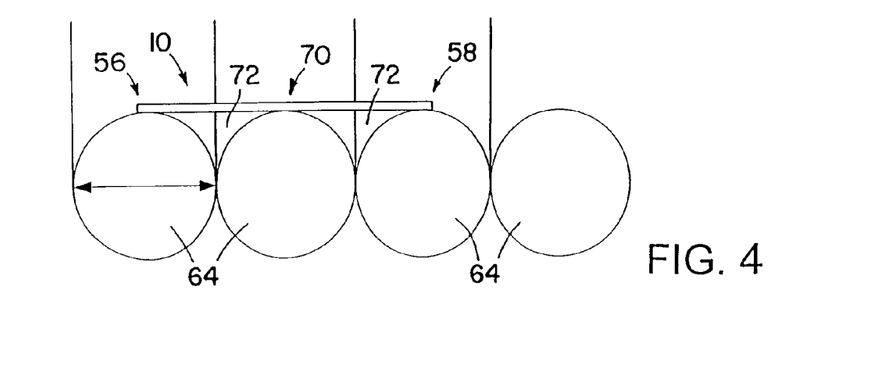
FIG. 4 is a plan view illustrating another possible placement of an RFID device with the antenna structure of FIG. 2, relative to the row of objects.

The various compensation elements of the antenna structure 12 cooperate to achieve a degree of position insensitivity in placement of an RFID device that includes the antenna structure 12. FIGS. 3 and 4 illustrate an RFID device 10 in a pair of different positions relative to a row of objects 64. The objects 64 may be 65 mm-diameter soft drink cans lined up in a row, such as in a carton upon which an RFID label is to be placed. FIG. 3 shows the RFID device placed with its center 70 between a pair of adjacent objects 64, the center 70 being placed along a triangular air space 72. The antenna tips 56 and 58 are also located along similar air spaces 73 and 74. FIG. 4 shows the antenna structure 12 located such that the center 70 and the tips 56 and 58 are located closest to the objects 64.

In testing of an RFID device using the antenna structure 12 shown in FIG. 2, moving the RFID device 10 from the position of FIG. 3 to that of FIG. 4 resulted in a reduction of operating frequency by about 1%, from 897 MHz to 888 MHz. The RFID device was readable at a distance of 2.7 m in the position of FIG. 3, and was readable at a distance of 2 m in the position of FIG. 4.

Figure 21:
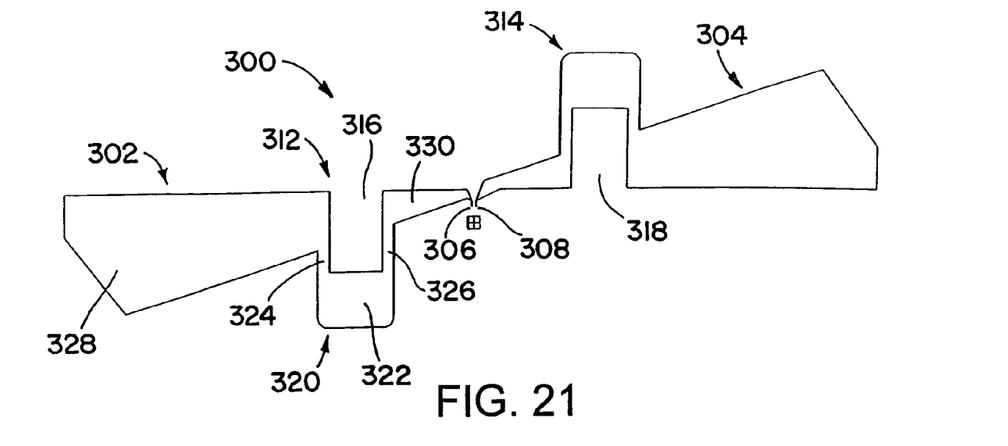
FIG. 21 is a plan view of another embodiment of an adaptive antenna structure which has compensation elements usable with the present invention.

In contrast, movement of an RFID device with a previous antenna structure from the position of FIG. 3 to the position of FIG. 4 resulted in a reduction of operating frequency from 887 MHz to below 755 MHz. The previous antenna structure was readable at a distance of 2 m in the position of FIG. 3, but was not readable at all in the position of FIG. 4. (This previous antenna structure is shown in FIG. 21, and is discussed further below in connection with that figure.)

From these results it is seen that the RFID device 10 using the antenna structure 12 of FIG. 2 was substantially invariant to position with the length of the RFID device 10 substantially perpendicular to the axes of the objects 64.

In testing RFID devices the device was placed on a product or simulated product environment, at a known distance from a reader system antenna. The level of attenuation was determined for which the device responded. This level was used to predict the range for which the RFID device could be read or otherwise detected. For example, if the RFID device read at 6 dB added attenuation at a range of 1 m, it would be predicted to be read at 0 dB at 2 m, since the attenuation due to free space attenuation propagation obeys a square law and increases by 6 dB for every doubling of the distance between the reader and the RFID device. By maintaining the same distance between the RFID device and the reader, and determining the attenuation, effects, such a multi-path propagation may be avoided.

The antenna structure of an RFID device may be considered "position insensitive" over a range of positions if its performance (gain) over the range of positions varies by no more than a given amount, such as 3 dB or 6 dB. Testing of gain could be performed at a given frequency or frequency range of interest, such as from 902 MHz to 928 MHz or from 860 MHz to 880 MHz. As noted in the previous paragraph, such a measure provides an indication of the performance and range of the RFID device. Thus the position insensitivity of a device that includes the antenna structure may alternatively be expressed as invariance in read range for a given environment, over a given range of frequency. Variations in read range less than a given amount, for example 50%, may be taken as indicating position insensitivity or invariance in the antenna structure.

As another possible measure of position insensitivity, the antenna structure of an RFID device may be considered "position insensitive" over a range of positions if its frequency varies by no more than a given amount (e.g., 20 MHz or 10 MHz) or proportion (e.g., 10%, 5%, or 2%). Other measures of position insensitivity or position invariance could be employed, such as tests measuring the energy absorbed by the RFID device.

Tests have been described above with regard to a single environment of a row of cans, separated from the RFID device 10 by a layer of cardboard. Such a test simulates performance of an RFID label placed on a carton. However, it will be appreciated that many other possible environments for RFID devices are possible, including environments with different arrays of periodic placement of objects, environments with non-periodic placement of given objects, and environments which include placements of different types of objects, having different characteristics.

Figure 5:
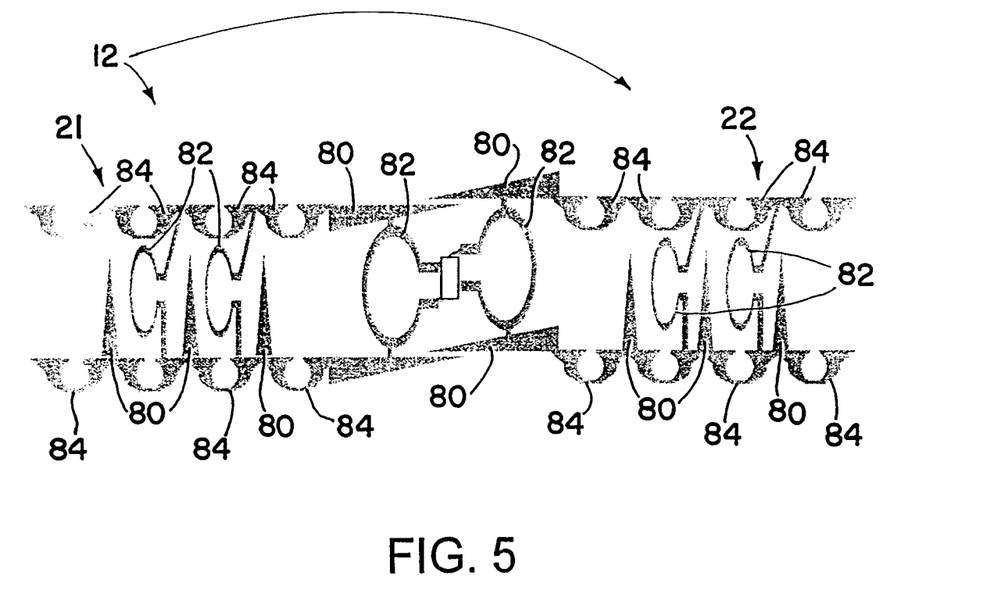
FIG. 5 is a plan view of one embodiment of an antenna structure in accordance with the present invention.

FIG. 5 shows another embodiment antenna structure 12 that is configured to provide good performance over a multiple dimension range of positions. The antenna structure 12 includes antenna elements 21 and 22, with a chip 20 coupled to the antenna elements 21 and 22. The antenna elements 21 and 22 each have multiple tapered electrical compensation elements 80, open loop magnetic compensation elements 82, and combined electrical and magnetic compensation elements 84.

Figure 6:
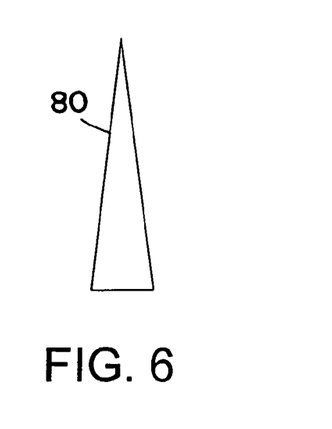
FIG. 6 is a plan view of an electrical compensation element used in the antenna structure of FIG. 5.
Figure 7:
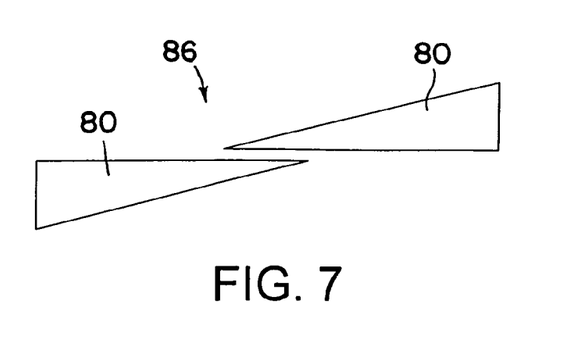
FIG. 7 is a plan view of another electrical compensation element used in the antenna structure of FIG. 5.

FIGS. 6 and 7 show two examples of tapered electrical compensation elements 80, with FIG. 6 showing a single tapered electrical compensation element 80, and FIG. 7 showing a pair of tapered electrical compensation elements 80 in proximity to one another to create a combined electrical compensation element 86. The compensation elements interact with nearby dielectric materials, primarily through electrical fields.

Figure 8:
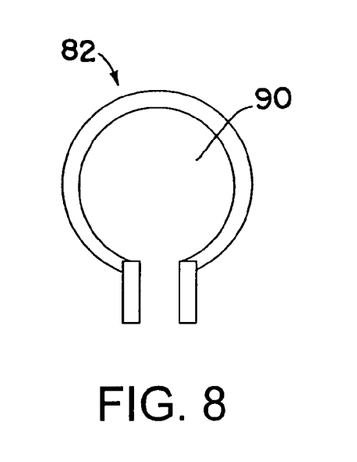
FIG. 8 is a plan view of a magnetic compensation element used in the antenna structure of FIG. 5.

FIG. 8 shows an enlarged view of one of the open loop magnetic compensation elements 82. The conductive material of the open loop magnetic compensation element 82 encloses a circular area 90. Current flowing through the conductive material of the open loop magnetic compensation element 82 sets up a magnetic field that interacts with nearby electrically conductive materials, primarily through magnetic fields.

Figure 9:
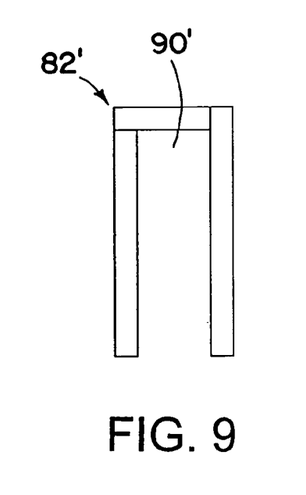
FIG. 9 is a plan view of an alternate embodiment magnetic compensation element usable in the antenna structure of FIG. 5.

FIG. 9 shows an alternative open loop magnetic compensation element 82' that may be used in place of the open loop magnetic compensation element 82 of FIG. 9. The open loop magnetic compensation element 82' substantially encloses a rectangular area 90'. As with the compensation element 82, current flowing through the conductive material of the open loop magnetic compensation element 82', around the area 90', sets up a magnetic field that may interact with nearby electrically-conductive objects or materials.

Figure 10:
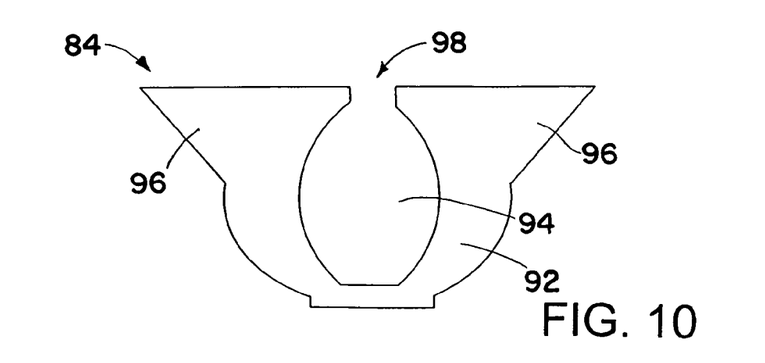
FIG. 10 is a plan view of a combined electrical and magnetic compensation element used in the antenna structure of FIG. 5.

FIG. 10 shows an enlarged view of one of the combined electrical and magnetic compensation elements 84. The element 84 includes a loop 92 that substantially encloses an area 94, such that current flow through conductive material of the element 84 sets up a magnetic field that interacts with nearby electrically-conductive objects or materials. At ends of the loop 92, the conductive material of the element 84 has tapered portions 96 that approach each other, leaving a gap 98 between them at their closest approach. The conductive material on either side of the gap 98 interacts with an electrical field interaction that is dependent on nearby dielectric material. Thus the combined compensation element 84 also interacts with surrounding materials through electrical field interactions.

The antenna structure 12 of FIG. 5 has multiple compensation elements in different orientations. This increases complexity of the antenna structure, but may allow increased flexibility in locating the antenna structure 12 relative to nearby objects, while still achieving acceptable performance of the antenna structure 12. To illustrate, the antenna structure 12 of FIG. 2 may achieve only a one-dimensional range of positions, being required for example to be located with a given orientation relative to nearby objects, for example substantially perpendicular to the axes of the objects 64 (FIGS. 3 and 4), while being able to be shifted anywhere along a line along the length of the antenna structure. In contrast, the antenna structure 12 of FIG. 5 may be capable of acceptable performance over a multi-dimensional range of positions, for example being able to be placed substantially anywhere on a side of a carton of soft drink cans, without regard to positioning between or over cans, and without regard to orientation relative to the axes of the cans.

What follows now are descriptions of various types of compensation elements that may be included as compensation elements in antenna structures having suitably invariant performance over a range of positions. Although several broad types of compensation elements are discussed below, it will be appreciated that the broad types discussed do not exhaust the varieties of various types of electrical and magnetic compensation elements that may be incorporated into the antenna structure 12. At least some of the compensation elements described below are also disclosed in PCT Application No. PCT/US04/11147, which is herein incorporated by reference in its entirety. As such, the individual compensation elements discussed below (but not their combination as described above) have been disclosed previously.

Figure 11:
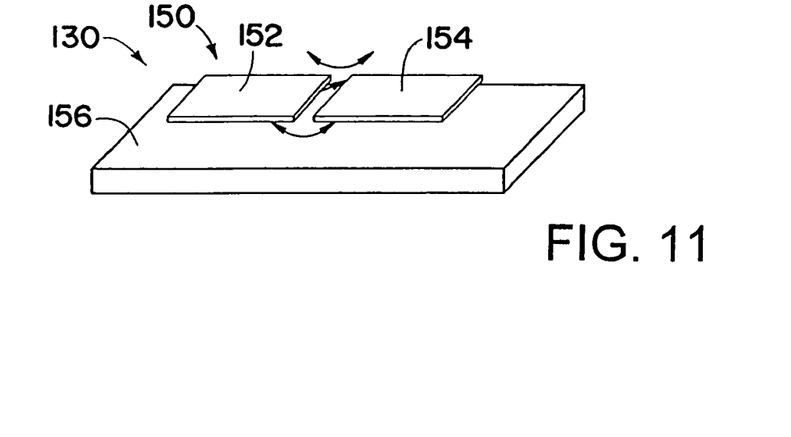
FIG. 11 is a plan view of capacitor shown mounted on a dielectric material.

One general type of compensation element 130 is a capacitor 150, illustrated in FIG. 11. The capacitor 150 includes a pair of conductive plates 152 and 154 mounted or printed on a dielectric substrate 156. The capacitance between these plates is a function of the separation, size and, importantly, the dielectric constant of the substrate. In general, as the relative dielectric constant (Er) increases, so will the capacitance C between the plates.

Figure 12:
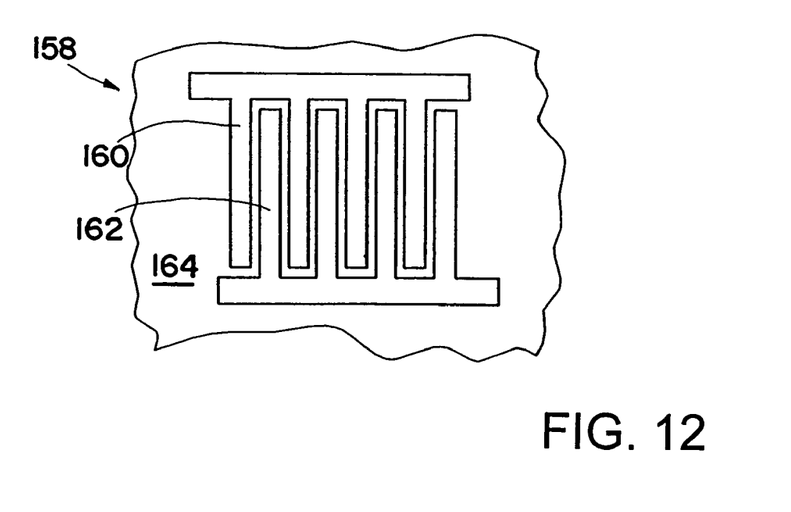
FIG. 12 is a plan view of one type of adaptive element for use in the present invention, an inter-digital capacitor.

One specific type of capacitor that embodies the present invention is shown in FIG. 12. The capacitor 158 shown there is formed by the cross coupling of electromagnetic fields formed between the capacitor "fingers" 160 and 162 on a dielectric 164. The capacitor 158 is referred to herein as an inter-digital capacitor. The capacitance and other characteristics of the capacitor 158 are generally a function of the spacing between the fingers 160 and 162, the number of fingers, the dimensions of the fingers 160 and 162, and the dielectric constant of the dielectric material 164, on which the capacitor 158 is attached. It will be appreciated that the characteristics of the capacitor 158 will also be a function of other nearby dielectric materials, allowing the capacitor 158 to interact with nearby dielectric materials through electric fields.

Figure 13:
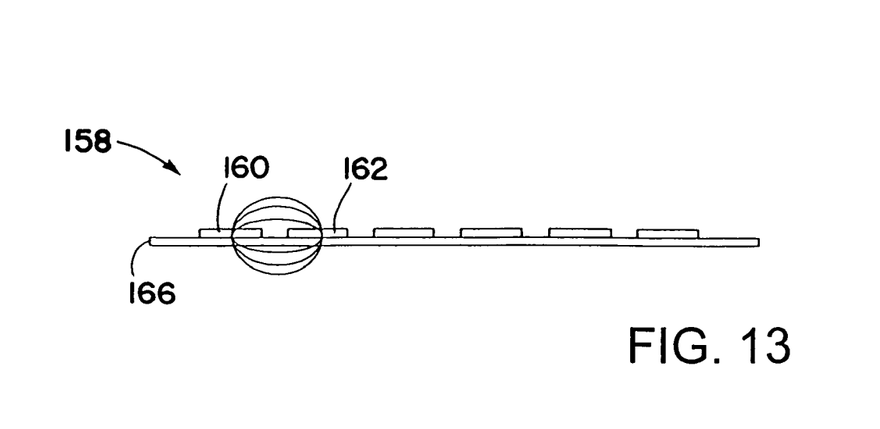
FIG. 13 is a side view taken along the adaptive element of FIG. 12.
Figure 14:
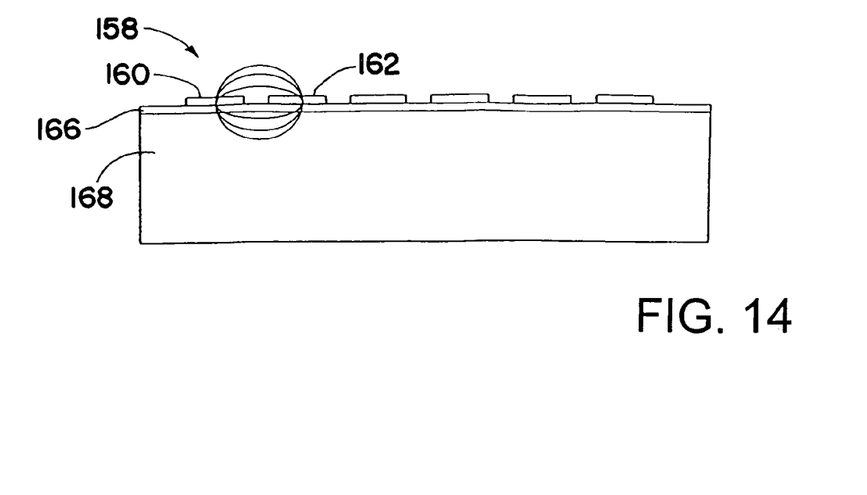
FIG. 14 is a side view similar to that of FIG. 13 where the capacitor is mounted on a thicker material than that of the capacitor in FIG. 13.

FIGS. 13 and 14 illustrate the electric field around the capacitor 158 for two different dielectric substrates 164. FIG. 13 shows the capacitor 158 on a relatively thin substrate 166, such as a 100 μm polyester layer. FIG. 14 shows the capacitor 158 and the thin substrate 166 on a relatively thick substrate 168, such as a 30 mm thick dielectric block or slab having a dielectric constant between 2 and 7.

For the condition shown in FIG. 13, the inter-digital capacitor 158 is essentially in air, with the dielectric constant between the alternate fingers 160 and 162 being that of the thin substrate 166. Capacitance between fingers of the capacitor is a function of the dielectric constant around the fingers as the electric field spreads out, so it will have an initial value of $C_1$.

In the condition in FIG. 14, the electric field also is flowing in the block, and hence there is cross coupling between fingers of the capacitor. The capacitance $C_2$ is affected by the presence of the block, in particular by the dielectric constant of the material. Thus this arrangement comprises a component having a capacitance (C) that is a function of the relative dielectric constant of the block on which it is mounted, i.e., $C=f(E_r)$, where $E_r$ is the relative dielectric constant of the block. As the dielectric constant of the block increases, the capacitance increases. The component capacitance will also be a function of the block thickness as a thinner block will have less of an electromagnetic field in it, so will, for a given $E_r$, increase the capacitance by a lesser amount.

Figure 15:
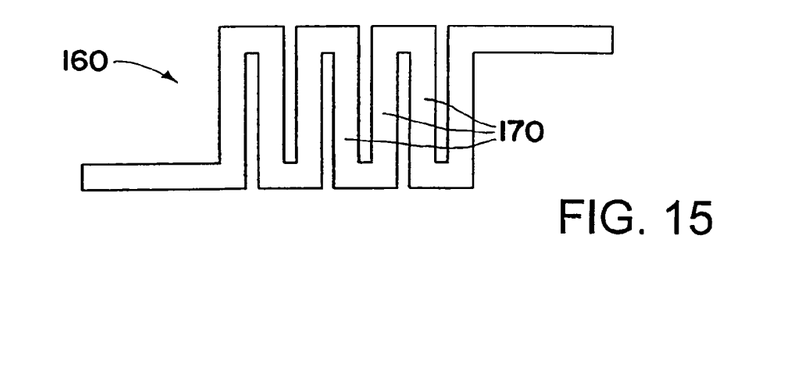
FIG. 15 is a plan view of another type of adaptive element usable with the present invention, a meander inductor.

FIG. 15 illustrates one possible inductor structure, a spiral or meander inductor 169 having a number of turns or other parts (meanders) 170 in close proximity to adjacent of the turns or other parts 170. This structure has a self-resonance, due to the capacitance between the turns. Hence the net inductance value can also be made a function of substrate $E_r$.

In air, this meander inductor component will have a certain value of inductance, L. When it placed on higher dielectric constant materials of significant thickness, the capacitive cross coupling between meanders increases, causing a reduction in overall inductance.

Figure 16:
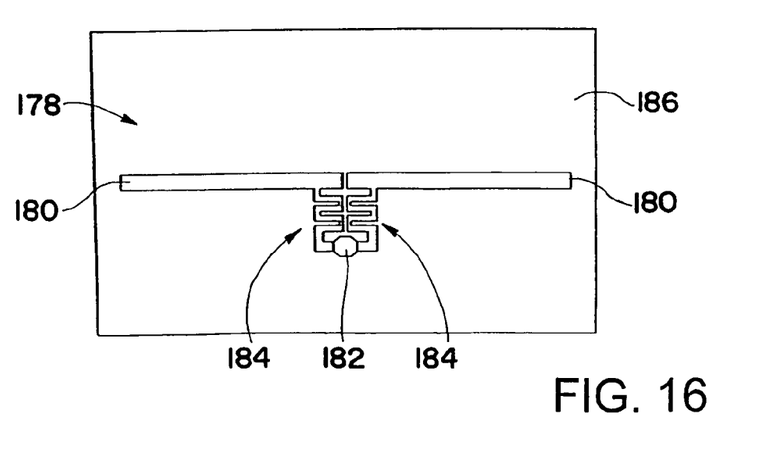
FIG. 16 is a plan view of an RFID tag structure using meander inductors.

FIG. 16 is a simplified illustration of how meander inductor components are used. A dipole antenna 178 with elements 180 is connected to an RFID chip 182 through meander inductors 184. The antenna 178, the inductors 184, and the chip 182 are attached to a thin dielectric material 186 (more precisely, a low dielectric constant substrate such as a 100 μm-thick polyester film) by being printed thereon, glued thereto, or mounted thereon in any of the customary ways.

Figure 17:
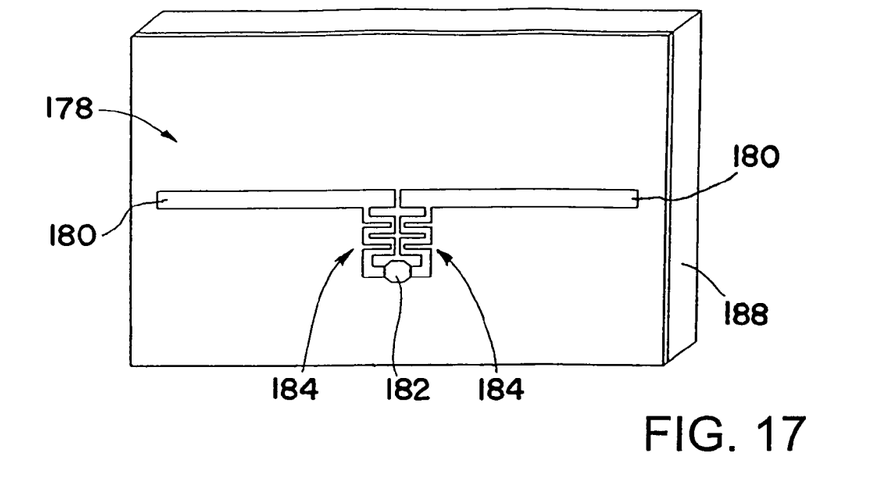
FIG. 17 is a plan view of an RFID tag structure embodying similar to that shown in FIG. 16, where the tag is mounted on a thicker material than that of the tag in FIG. 16.

FIG. 17 illustrates another configuration using the meander inductors 184, added between the dipole antenna 178 and chip 182. The dipole antenna 178, the chip 182, and the meander inductors 184 are all on a higher dielectric constant substrate 188.

If the basic dipole antenna 178 is sized for placement in air or on a low dielectric constant $E_r$ substrate, when the dipole antenna 178 is placed on a higher dielectric constant $E_r$ substrate 188, the antenna elements are too long at the chosen operating frequency. This manifests itself primarily by the antenna becoming inductive, that is, +jX increasing. Without compensation between the antenna 178 and the chip 182, the impedance match and hence tag performance would degrade. However, the meander inductors 184 have reduced the inductance on the higher dielectric constant $E_r$ substrate 188. The meander inductors 184 on the substrate 188 thus provide a smaller +jX to the circuit, so with proper selection of characteristics a good impedance match is maintained.

The single capacitive and inductive elements discussed above show the principle of a component's value being dependant on the characteristics of the substrate on which it is placed. A number of other components, which can be formed on a film next to an antenna that will react to the varying dielectric constant of the substrate material and its thickness, can be made, including multiple capacitors, inductors and transmission line elements (which can act as transformers), acting in parallel or series with one another to provide a substrate-dependant variable reactance. These substrate-dependant variable-reactance components can be used to re-tune and re-match the antenna/chip combination, to maintain performance for some antenna types over a certain range of substrate characteristics.

From the foregoing it has been established that surface features of a structure can react to or interact with the substrate upon which they are mounted, changing operating characteristics depending upon local environment, particularly upon the dielectric character of the substrate. However, using these components alone is not always the best solution. Another approach for the compensation element 130 is for structures which change the effective length of antenna based on the environment in the vicinity of the compensation elements, particularly based on dielectric characteristics of the dielectric material upon which the compensation element 130 are mounted. Some simple structures and methods of changing the effective length of antenna elements are now described.

Figure 18:
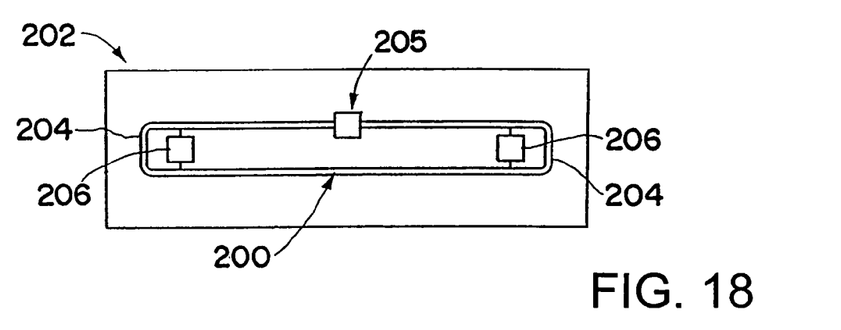
FIG. 18 is an RFID tag incorporating a folded dipole antenna structure.

For this purpose, one of the simplest antennas to consider will be a folded dipole 200, as illustrated as part of an RFID device 202, in FIG. 18. The total length of the loop 204 of the folded dipole antenna 200 is set to provide a good match to an RFID chip 205 at the minimum dielectric constant the tag is designed to operate with, as an example, a 30 mm block having a dielectric constant of $E_r=2$.

The adaptive elements 206 may include a printed series tuned circuit, consisting of an inductor, which is a simple meander of narrow line, and an inter-digital capacitor as discussed and illustrated previously. The value of the inductor and capacitor is such that, on materials having a dielectric constant of $E_r=2$, the resonance frequency is above 915 MHz, as the capacitor value is low. If the complete tag is placed on a 30 mm substrate having a dielectric constant of $E_r=4$, the correct length of the loop for the folded dipole is now shorter. However, the capacitor inside the adaptive element 206 may have increased in value, making the loop resonant at 915 MHz. The adaptive capacitive element now acts like a short circuit, providing a reduced length path for the RF current which is ideally exactly the path length to make the antenna correctly matched to the chip on materials having a dielectric constant of $E_r=4$. It will be appreciated that the values and numbers in the examples are intended for explaining general principles of operation, and do not necessarily represent real antenna and RFID tags designs.

This is an example using substrate properties as embodied in the present invention to adapt the effective length of an antenna. Alternately, distributed versions can be envisaged, where the inductance and capacitance are spread along the antenna length. It will be appreciated that these capacitive and inductive elements may be used in series and/or parallel combinations and may potentially, combined with a antenna having appropriate characteristics, allow the impedance match to be adjusted as the substrate $E_r$ varies, to allow the antenna performance to be maintained.

An alternative structure is one where the compensating element 130, such as the adaptive element 206, adjusts the effective length of the antenna. When an antenna is placed on or in a medium of a different $E_r$, the wavelength of a defined frequency changes. The ideal length for that antenna in the medium, to obtain a low or zero reactance and useful radiation resistance, would be shorter.

Therefore an antenna that reduces its effective length as the substrate dielectric constant varies would provide compensation. A concept for a structure that can achieve this is shown below in FIG. 19. This is a non-limiting example as a number of other suitable configurations are possible using various of the structures and methods described herein, alone or in combination with one another.

Figure 19:
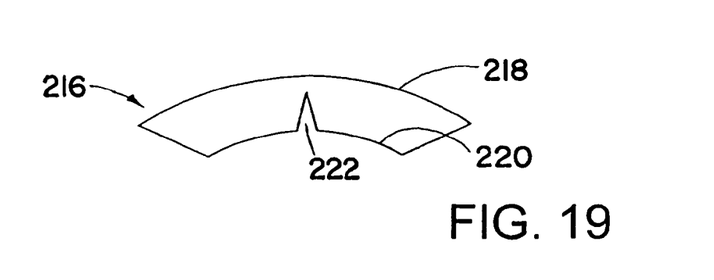
FIG. 19 is an antenna structure that embodies the present invention to reduce its effective length as the dielectric constant of the material on which it is mounted varies.

FIG. 19 is a plan view showing a curved section of a rectangular cross section conductor 216 designed to be placed on a substrate having any of a variety of values of $E_r$. This would form part of the two arms of a dipole antenna. More than one section may be used. The conductor 216 has potentially two paths for the current to flow: an outer curve 218 and an inner curve 220. The length of the transmission path is actually different between these two curves. The slit 222 acts as a capacitor. As the substrate $E_r$ increases in its dielectric constant value, the capacitance between the two radiating sections likewise increases, but the effective transmission path decreases in length.

It will be appreciated that many alternatives are possible for providing adaptive structures that are configured to compensate to some extent for different values of dielectric constant in a substrate to which the adaptive or compensating antenna structure is attached. For example, cross coupling between a simple wave format structure could also be designed to provide compensation. Cross-coupled structures have been described above.

Figure 20:
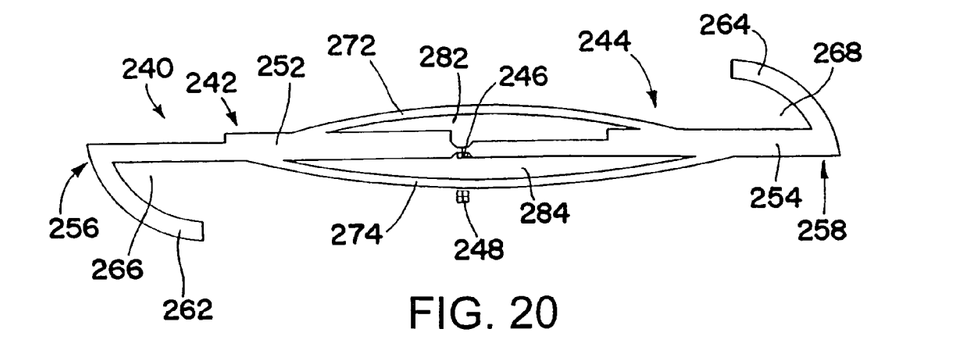
FIG. 20 is a plan view of one embodiment of an adaptive antenna structure usable with the present invention.

FIG. 20 shows an antenna structure 240 that includes some adaptive elements that are examples of compensating elements of some of the types discussed above. The antenna structure 240 includes a pair of antenna elements 242 and 244 that are coupled to an RFID chip or strap at respective attach points 246 and 248. The antenna elements 242 and 244 have respective main antenna lines 252 and 254. At the end of the main antenna lines 252 and 254 are capacitive stubs 256 and 258. The capacitive stubs 256 and 258 include respective conductive tails 262 and 264 that bend back toward the corresponding main antenna lines 252 and 254. Gaps 266 and 268 between the conductive tails 262 and 264, and the main antenna lines 252 and 254, widen further with further distance from the joinder of the conductive tails and the main antenna lines. The capacitive stubs 256 and 258 have variable characteristics, depending on the dielectric constant of the substrate to which the antenna structure 240 is attached. More particularly, the capacitance between the conductive tails 262 and 264 and the main antenna lines 252 and 254, respectively, is a function of the dielectric constant of the substrate material upon which the antenna structure 240 is mounted.

The antenna structure 240 also includes loop lines 272 and 274 on either side of the main antenna lines 252 and 254. As shown, the loop lines 272 and 274 are narrower than the main antenna lines 252 and 254. Each of the loop lines 272 and 274 is coupled to both of the main antenna lines 252 and 254. There is a gap 282 between the loop line 272 and the main antenna lines 252 and 254. A corresponding gap 284 is between the loop line 274 and the main antenna lines 252 and 254. The gaps 282 and 284 have variable thickness, being narrow where the loop lines 272 and 274 join with the main antenna lines 252 and 254, and widening out toward the middle of the loop lines 272 and 274. The loop lines 272 and 274 function as inductors.

FIG. 21 shows an alternate antenna structure 300 having a pair of generally triangular antenna elements (conductive tabs) 302 and 304. The antenna elements 302 and 304 have attachment points 306 and 308 for coupling an RFID chip or strap to the antenna structure 300.

The antenna elements 302 and 304 have respective compensation or adaptive portions or elements 312 and 314. The adaptive portions 212 and 214 provide gaps 316 and 318 in the generally triangular conductive tabs. On one side of the gap 316 is a conductive link 320, including a relatively wide central portion 322, and a pair of relatively narrow portions 324 and 326 along the sides of the gap 316, coupling the central portion 322 to the parts 328 and 330 of the antenna element 302 on either side of the gap 316. The central portion 322 may have a width approximately the same as that of the antenna element parts 328 and 330 in the vicinity of the gap 316. The narrow portions 324 and 326 may be narrower than the central portion 322 and substantially all of the antenna element parts 328 and 330. The antenna element 304 may have a conductive link 334, substantially identical to the conductive link 320, in the vicinity of the gap 318.

The antenna structure 300 has been found to give good performance when mounted on walls of cardboard cartons filled with a variety of different products containing both conductive and non-conductive materials. The antenna structure 300, and in particular the adaptive portions 312 and 314, may provide compensation for various environments encountered by the antenna structure 300, for example including variations in substrate characteristics and variations in characteristics of nearby objects. As one example of placement of the antenna structure 300, the antenna structure 300 may be mounted onto a cardboard container 3-4 mm thick.

It will be appreciated that the layout of the antenna structure 12, including the selection and location of the compensation elements, and the overall size of the antenna structure 12, may be determined by any of a variety of suitable methods. One such suitable method is use of genetic algorithms to iteratively generate antenna structure layouts. Generated layouts are tested for performance in meeting suitable criteria, for example using computer simulations to simulate performance of the layout in various positions and/or environments. Generated layouts that perform best may be combined to produce a new generation of possible antenna structure layouts. The iterative process of generating, testing, and combining layouts may be iteratively continued until some suitable performance or other criterion is met.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An RFID device comprising:
   a transponder chip;
   an electrically conductive antenna structure operatively coupled to the transponder chip, wherein the conductive structure includes:
   one or more electrical compensation elements that interact with nearby objects primarily using electric fields; and
   one or more magnetic compensation elements that interact with the nearby objects primarily using magnetic fields;
   wherein the compensation elements provide substantially position insensitive performance of the antenna structure over a range of positions relative to nearby objects; and
   wherein, over the range of positions, some of the compensation elements affect antenna performance the antenna structure in one way, while other of the compensation elements affect the antenna performance in an opposite way.

2. The RFID device of claim 1, wherein the antenna structure includes a pair of antenna elements coupled to the transponder chip.

3. The RFID device of claim 2, wherein each of the antenna elements include respective of the electrical compensation elements.

4. The RFID device of claim 3, wherein the magnetic compensation elements electrically connect together the antenna elements.

5. The RFID device of claim 4, wherein the magnetic compensation elements include an open loop magnetic compensation element.

6. The REID device of claim 5, wherein the open loop magnetic compensation element encloses a substantially circular area.

7. The RFID device of claim 3, wherein the electrical compensation elements include meanders of electrically conductive material.

8. The REID device of claim 3, wherein the antenna elements together form a loop that substantially encloses an area between the antenna elements; and
   wherein distal ends of the antenna elements are tapered, widening to approach each other at an end of the loop distal from the chip.

9. The REID device of claim 1, wherein the compensation elements include tapered areas of electrically conductive material.

10. The RFID device of claim 1, in combination with an object to which the RFID device is attached.

11. The REID device of claim 1, wherein the antenna structure has a gain that varies by no more than 6 dB, over a frequency range that that includes at least one of 902 MHz to 928 MHz or 860 MHz to 880 MHz, over the range of positions relative to nearby objects.

12. The RFID device of claim 1, wherein, over the range of positions, the some of the compensation elements increase gain of the antenna structure, and the other of the compensation elements decrease the gain of the antenna structure.

13. The RFID device of claim 1, wherein, over the range of positions, the some of the compensation elements increase operating frequency of the antenna structure, and the other of the compensation elements decrease the operating frequency of the antenna structure.

14. An RFID device comprising:
   a transponder chip;
   an electrically conductive antenna structure operatively coupled to the transponder chip, wherein the conductive structure includes:
   one or more electrical compensation elements that interact with nearby objects primarily using electric fields; and
   one or more magnetic compensation elements that interact with the nearby objects primarily using magnetic fields;
   wherein the compensation elements provide substantially position insensitive performance of the antenna structure over a range of positions relative to nearby objects;
   wherein the antenna structure includes a pair of antenna elements coupled to the transponder chip;
   wherein each of the antenna elements include respective of the electrical compensation elements;
   wherein the magnetic compensation elements electrically connect together the antenna elements; and
   wherein the magnetic compensation elements include electrically conductive inductor lines.

15. An RFID device comprising:
   a transponder chip;

an electrically conductive antenna structure operatively coupled to the transponder chip, wherein the conductive structure includes:
  one or more electrical compensation elements that interact with nearby objects primarily using electric fields; and
  one or more magnetic compensation elements that interact with the nearby objects primarily using magnetic fields;
wherein the compensation elements provide substantially position insensitive performance of the antenna structure over a range of positions relative to nearby objects;
wherein the antenna structure includes a pair of antenna elements coupled to the transponder chip;
wherein each of the antenna elements include respective of the electrical compensation elements;
wherein the magnetic compensation elements electrically connect together the antenna elements;
wherein the magnetic compensation elements include an open loop magnetic compensation element; and
wherein the open loop magnetic compensation element encloses a substantially rectangular area.

16. An RFID device comprising:
a transponder chip;
an electrically conductive antenna structure operatively coupled to the transponder chip, wherein the conductive structure includes:
  one or more electrical compensation elements that interact with nearby objects primarily using electric fields; and
  one or more magnetic compensation elements that interact with the nearby objects primarily using magnetic fields;
wherein the compensation elements provide substantially position insensitive performance of the antenna structure over a range of positions relative to nearby objects;
wherein the compensation elements include tapered areas of electrically conductive material; and
wherein the tapered areas have curved ends at distal parts of the compensation elements that function as electrical compensation elements.

17. A combination comprising:
an RFID device that includes:
  a transponder chip;
  an electrically conductive antenna structure operatively coupled to the transponder chip, wherein the conductive structure includes:
    one or more electrical compensation elements that interact with nearby objects primarily using electric fields; and
    one or more magnetic compensation elements that interact with the nearby objects primarily using magnetic fields; and
an object to which the RFID device is attached;
wherein the compensation elements provide substantially position insensitive performance of the antenna structure over a range of positions;
wherein the object is a carton or container containing metal objects; and
wherein the range of positions includes a first position that has a center of the RFID device halfway between adjacent of the metal objects, and a second position that has the center of the RFID device at a location closest to one of the metal objects.

18. The combination of claim 17, wherein the metal objects are located in a periodic arrangement within the carton or container.

19. The combination of claim 18, wherein the range of positions includes a one-dimensional range of positions of the RFID device along a side of the carton or container.

20. The combination of claim 18, wherein the range of positions includes a two-dimensional range of positions of the RFID device along a side of the carton or container.

21. The combination of claim 18, wherein the range of positions includes a range of orientations of the RFID device along a side of the carton or container.

22. The combination of claim 18, wherein the range of positions includes substantially anywhere along a side of the carton or container.

23. The combination of claim 22, wherein the antenna structure has a gain that varies by no more than 6 dB, over a frequency range that that includes at least one of 902 MHz to 928 MHz or 860 MHz to 880 MHz, over the range of positions relative to nearby objects.

24. The combination of claim 18, wherein in the first position the center of the RFID device overlies a substantially triangular air space.

* * * * *